(12) United States Patent
Schneider et al.

(10) Patent No.: US 10,116,369 B2
(45) Date of Patent: *Oct. 30, 2018

(54) COMMUNICATION DEVICE AND METHOD PROVIDING BEAMFORMING FOR TWO OR MORE TRANSMISSION CHANNELS

(71) Applicant: SONY CORPORATION, Tokyo (JP)

(72) Inventors: Daniel Schneider, Stuttgart (DE); Andreas Schwager, Waiblingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,417

(22) Filed: Oct. 7, 2016

(65) Prior Publication Data

US 2017/0026097 A1    Jan. 26, 2017

Related U.S. Application Data

(63) Continuation of application No. 14/767,207, filed as application No. PCT/EP2014/000584 on Mar. 6, 2014, now Pat. No. 9,490,887.

(30) Foreign Application Priority Data

Mar. 28, 2013  (EP) ..................................... 13001648

(51) Int. Cl.
*H04B 7/02*  (2018.01)
*H04B 7/06*  (2006.01)
(Continued)

(52) U.S. Cl.
CPC ............. *H04B 7/0617* (2013.01); *H04B 3/32* (2013.01); *H04B 3/54* (2013.01); *H04B 3/544* (2013.01);
(Continued)

(58) Field of Classification Search
CPC .......... H04B 7/0617; H04B 3/32; H04B 3/54; H04B 3/544; H04B 7/0413;
(Continued)

(56) References Cited

U.S. PATENT DOCUMENTS 8,660,196 B2    2/2014  Schwager et al.
8,848,819 B2    9/2014  Murakami et al.
(Continued)

FOREIGN PATENT DOCUMENTS

EP    2 524 453 A1    11/2012
EP    2 538 570 A1    12/2012
(Continued)

OTHER PUBLICATIONS

International Search Report dated Jun. 11, 2014, in PCT/EP2014/000584 filed Mar. 6, 2014.
(Continued)

*Primary Examiner* — Helene Tayong
(74) *Attorney, Agent, or Firm* — Xsensus, LLP

(57) ABSTRACT

A control unit of a communication device provides multicast precoding information from at least first beamforming information descriptive for a first transmission channel and second beamforming information descriptive for a second transmission channel. A precoder unit beamforms at least one signal using the multicast precoding information to obtain at least two precoded signals. A transmitter circuit which is electrically coupled to the precoder unit multicasts transmission signals through the at least first and a second transmission channels, wherein the transmission signals are derived from the precoded signals.

18 Claims, 10 Drawing Sheets

(51) Int. Cl.
| | |
|---|---|
| *H04B 3/54* | (2006.01) |
| *H04B 3/32* | (2006.01) |
| *H04L 1/00* | (2006.01) |
| *H04W 4/06* | (2009.01) |
| *H04W 72/00* | (2009.01) |
| *H04B 7/0413* | (2017.01) |

(52) U.S. Cl.
CPC ............. *H04L 1/0014* (2013.01); *H04W 4/06* (2013.01); *H04W 72/005* (2013.01); *H04B 7/0413* (2013.01); *H04B 2203/5425* (2013.01)

(58) Field of Classification Search
CPC ......... H04B 2203/5425; H04L 1/0014; H04W 4/06; H04W 72/005
USPC ........................................................ 375/267
See application file for complete search history.

(56) References Cited

U.S. PATENT DOCUMENTS

| | | | |
|---|---|---|---|
| 9,503,930 | B2* | 11/2016 | Wang ................... H04L 1/0041 |
| 2002/0072817 | A1 | 6/2002 | Champion |
| 2005/0018766 | A1 | 1/2005 | Iwamura |
| 2005/0050578 | A1 | 3/2005 | Ryal |
| 2005/0114489 | A1 | 5/2005 | Yonge, III et al. |
| 2006/0165117 | A1 | 7/2006 | Iwamura |
| 2007/0075843 | A1 | 4/2007 | Riveiro et al. |
| 2007/0135085 | A1 | 6/2007 | Iwamura |
| 2007/0220570 | A1 | 9/2007 | Dawson et al. |
| 2008/0005350 | A1 | 1/2008 | Logvinov |
| 2008/0137761 | A1 | 6/2008 | Stadelmeier et al. |
| 2008/0298252 | A1 | 12/2008 | Yonge, III et al. |
| 2009/0060060 | A1 | 3/2009 | Stadelmeier et al. |
| 2009/0232286 | A1 | 9/2009 | Hurwitz |
| 2010/0061433 | A1 | 3/2010 | Stadelmeier et al. |
| 2010/0074243 | A1 | 3/2010 | Yonge, III et al. |
| 2010/0102900 | A1 | 4/2010 | Poveda Lerma et al. |
| 2010/0293241 | A1 | 11/2010 | Bishel |
| 2011/0059706 | A1* | 3/2011 | Harel ................... H04B 7/0404 455/115.1 |
| 2011/0169326 | A1 | 7/2011 | Logvinov |
| 2011/0274031 | A1 | 11/2011 | Gaal et al. |
| 2011/0317603 | A1 | 12/2011 | Ruiz Lopez et al. |
| 2011/0317723 | A1 | 12/2011 | Abad Molina et al. |
| 2011/0317784 | A1 | 12/2011 | Schwager et al. |
| 2012/0082196 | A1 | 4/2012 | Hurwitz et al. |
| 2012/0092093 | A1 | 4/2012 | Sakurai et al. |
| 2012/0093151 | A1 | 4/2012 | McFarland et al. |
| 2012/0126612 | A1 | 5/2012 | Hurwitz et al. |
| 2012/0183085 | A1 | 7/2012 | Hurwitz et al. |
| 2012/0236758 | A1 | 9/2012 | Yonge, III et al. |
| 2012/0239929 | A1 | 9/2012 | Newman et al. |
| 2012/0257683 | A1 | 10/2012 | Schwager et al. |
| 2012/0258760 | A1 | 10/2012 | Li et al. |
| 2012/0280565 | A1 | 11/2012 | Logvinov |
| 2012/0281742 | A1 | 11/2012 | Kliger |
| 2012/0300820 | A1 | 11/2012 | Eitel et al. |
| 2012/0322447 | A1* | 12/2012 | Ramachandran ..... H04W 48/18 455/436 |
| 2013/0002409 | A1 | 1/2013 | Molina et al. |
| 2013/0003760 | A1 | 1/2013 | Schwager et al. |
| 2013/0024706 | A1 | 1/2013 | Katar et al. |
| 2015/0236761 | A1 | 8/2015 | Schwager et al. |

FOREIGN PATENT DOCUMENTS

| | | |
|---|---|---|
| WO | WO 2011/079949 A1 | 7/2011 |
| WO | WO 2012/041424 A1 | 4/2012 |
| WO | WO 2012/044542 A1 | 4/2012 |
| WO | WO 2012/174456 A1 | 12/2012 |

OTHER PUBLICATIONS

Written Opinion of the International Searching Authority dated Jun. 11, 2014, in PCT/EP2014/000584 filed Mar. 6, 2014.

E. Karipidis et al., "Quality of Service and Max-Min Fair transmit Beamforming to Multiple Cochannel Multicase Groups", IEEE Transactions on Signal Processing, IEEE Service Center, vol. 56, No. 3, (Mar. 1, 2008), pp. 1268-1279. XP011203490.

V. Jungnickel V et al., "Interference-Aware Scheduling in the Multiuser MIMO-OFDM Downlink", Topics in Radio Communications. IEEE Communications Magazine, IEEE Service Center, vol. 47, No. 6, (Jun. 1, 2009), pp. 56-66, XP011263346.

Il Han Kim et al., "Optimal and Successive Approaches to Signal Design for Multiple Antenna Physical Layer Multicasting", IEEE Transactions on Communications, IEEE Service Center, vol. 59, No. 8, (Aug. 1, 2011), pp. 2316-2327, XP011380702.

Honghai Zhang et al., "Wireless Multicast Scheduling With Switching Beamforming Antennas", IEEE/ACM Transactions on Networking, IEEE/ACM, vol. 20, No. 5, (Oct. 1, 2012), pp. 1595-1607, XP011468509.

A. Schwager et al., "MIMO PLC: Theory, Measurements and System Setup", IEEE International Symposium on Power Line Communications and Its Applications, European Technology Center, (2011), 6 pages.

D. Schneider et al., "Precoded Spatial Multiplexing MIMO for Inhome Power Line Communications", IEEE Communications Society, Institute of Telecommunications, (2008), 5 pages.

D. Schneider et al., "Implementation and Results of a MIMO PLC Feasibility Study", IEEE Internatioal Symposium on Power Line Communications and Its Applications, Institute of Telecommunications, (2011), 6 pages.

Office Action dated Feb. 2, 2018 in European Patent Application No. 14 708 487.5, citing documents AX and AY therein, 6 pages.

Illsoo Sohn. et al., "D1.0-Comment Resolution-CID3408 Directed Multicast Service for MU-MIMO", IEEE P802.11 Wireless LANs, vol. 802.11ac, XP068037775, Nov. 2011, 5 pages.

Raja Banerjea, "302.11 TGac WG Letter Ballot LB187 Proposed resolutions to comments 4206 and 5384", IEEE P802.11 Wireless LANs, vol. 802.11ac, XP068039101, May 2012, 3 pages.

* cited by examiner

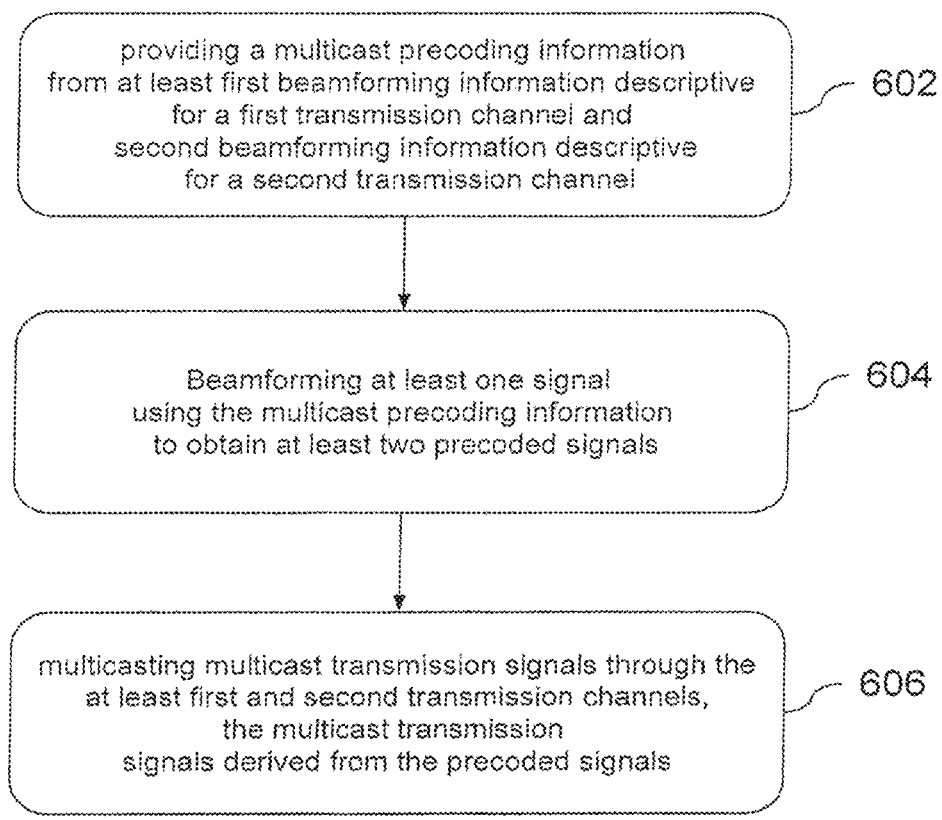

COMMUNICATION DEVICE AND METHOD PROVIDING BEAMFORMING FOR TWO OR MORE TRANSMISSION CHANNELS

CROSS-REFERENCE TO RELATED APPLICATIONS

The present application is a continuation of U.S. application Ser. No. 14/767,207, filed Aug. 11, 2016, which is a National Stage of PCT/EP2014/000584 filed Mar. 6, 2014, and claims priority to European Patent Application 13001648.8, filed in the European Patent Office on Mar. 28, 2013, the entire contents of each of which are incorporated herein by reference.

BACKGROUND

Field of the Disclosure

The present disclosure relates to a communication device to beamform a signal using a precoding matrix. The disclosure further relates to a communication device receiving information on a precoding matrix, and a communication system and a method of beamforming signals for the transmission through transmission channels.

Description of Related Art

Beamforming improves MIMO (multiple input multiple output) and MISO (multiple input single output) communication significantly. Typically, beamforming is used to modify the beam or spot for obtaining maximum SNRs (signal-to-noise-ratio) or maximum data throughput rates in unicast or broadcast communication links. In wired as well as wireless communication systems beamforming may also be used to minimize EMI (electromagnetic interference) at desired locations.

It is an object of the embodiments to provide communication devices for an improved communication system using beamforming as well as a communication system and a method providing enhanced beamforming capabilities.

SUMMARY

A control unit of a communication device provides multicast precoding information from at least first beamforming information descriptive for a first transmission channel and second beamforming information descriptive for a second transmission channel. A precoder unit beamforms at least one signal using the multicast precoding information to obtain at least two precoded signals. A transmitter circuit is electrically coupled to the precoder unit and multicasts transmission signals through the at least first and second transmission channels, wherein the transmission signals are derived from the precoded signals.

Another communication device includes a receiver circuit for receiving at least two multicast transmission signals. A decoder unit decodes the at least two transmission signals to obtain at least one decoded signal. The communication device is configured to transmit expanded beamforming information in response to a signal received through the receiver circuit.

A communication system includes at least three communication devices. A control unit of at least one of the communication devices provides multicast precoding information from at least first beamforming information descriptive for a first transmission channel and second beamforming information descriptive for a second transmission channel. A precoder unit beamforms at least one signal using the multicast precoding information to obtain at least two precoded signals. A transmitter circuit is electrically coupled to the precoder unit and multicasts transmission signals through the at least first and second transmission channels, wherein the transmission signals are derived from the precoded signals.

A method of operating a communication device includes providing multicast precoding information from at least first beamforming information descriptive for a first transmission channel and second beamforming information descriptive for a second transmission channel. At least one signal is beamformed using the multicast precoding information, wherein at least two precoded signals are obtained. Through a transmitter circuit which is electrically coupled to the precoder unit transmission signals derived from the precoded signals are multicast through the at least first and second transmission channels.

A communication device includes means for obtaining multicast precoding information from at least first beamforming information descriptive for a first transmission channel and second beamforming information descriptive for a second transmission channel, means for beamforming at least one signal using the multicast precoding information to obtain at least two precoded signals, and means for multicasting transmission signals derived from the precoded signals through the at least first and second transmission channels.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings. The elements of the drawings are not necessarily to scale relative to each other. In the following drawings, like reference numerals designate identical or corresponding parts throughout the several views. Features of the illustrated embodiments can be combined with each other to form yet further embodiments.

FIG. 6 is a simplified flowchart of a method of operating a communication device.

DESCRIPTION OF THE EMBODIMENTS

Figure 1A:
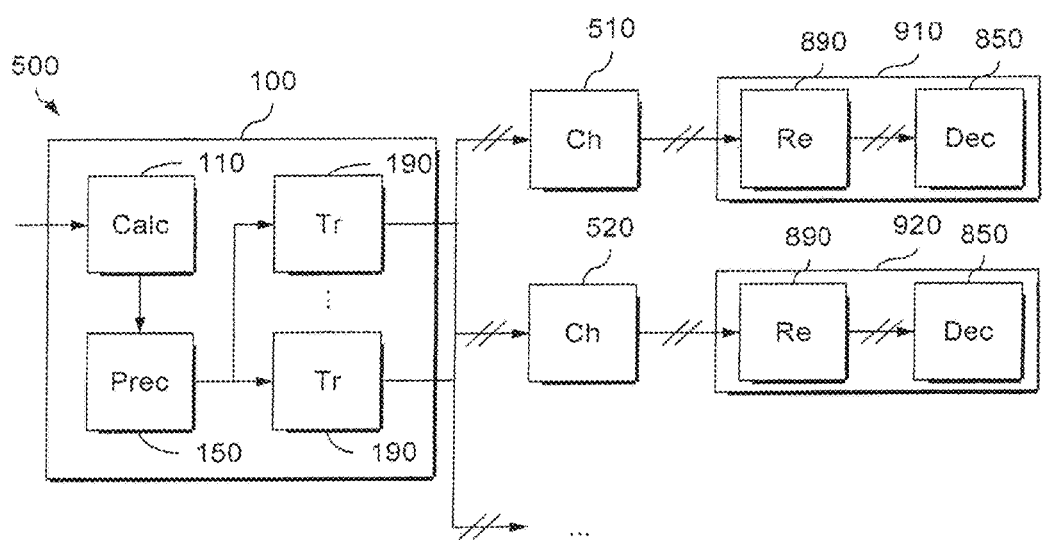
FIG. 1A is a schematic block diagram of a communication system providing multicast transmission according to an embodiment.

FIG. 1A illustrates a wireless or wired communication system 500. For example, the communication system 500 may be an xDSL (generic digital subscriber line) or a DVB-C2 (digital video broadcasting-cable) communication system, an ad-hoc network, for example a WLAN (wireless local area network) or a network of sensor and/or actuator devices. In accordance with an embodiment, the communication system 500 is a system using power distribution wires for data communications. For example, the communication system 500 employs power line communication (PLC), mains communications, power line telecommunications (PLT), broadband power line (BPL) or power band or power line networking (PLN) and is based on a modulated carrier superimposed to the 50 or 60 Hz alternating current of the power lines. The communication system 500 may apply an OFDM (orthogonal frequency division multiplexing) modulation scheme.

The communication system 500 is a MIMO or MISO system with at least one transmitting communication device 100 and at least two receiving communication devices 910, 920. A first communication link is established between the transmitting communication device 100 and a first receiving communication device 910 and a second communication link is established between the transmitting communication device 100 and a second receiving communication device 920. Further communication links may be established between the transmitting communication device 100 and further receiving communication devices. Signals exchanged between the transmitting communication device 100 and the receiving communication device 910 pass a first transmission channel 510 and signals exchanged between the transmitting communication device 100 and the second receiving communication device 920 pass through a second transmission channel 520. The first and second transmission channels 510, 520 may be wired or wireless channels. The transmitting communication device 100 may be an exclusively transmitting device with transmit ports only or a transceiver device including both transmitter and receiver units for transmitting and receiving signals through the same physical transmission channel. The receiving communication devices 910, 920 may be exclusively receiving devices or transceiver devices including both receiver and transmitter circuits for receiving and transmitting signals through the same physical channel.

The transmitting and receiving communication devices 100, 910, 920 may be stand-alone devices or may be integrated in electronic devices for consumer applications, for example in storage units, television sets, audio receivers, home servers storing video or audio content, routers connected to the internet, computers, video recorders, sensor devices and actuator devices.

The hardware configuration of the communication devices 100, 910, 920 may be almost identical, whereby the data transmission quantity may be asymmetric in the application. For example, a communication device integrated in a server may output large data contents like video streams whereas a communication device included in a television apparatus may output only comparatively short requests and handshake messages.

The transmitting communication device 100 includes a control unit 110 that provides multicast precoding information descriptive for a multicast precoding matrix from first beamforming information descriptive for the first transmission channel 510 and second beamforming information descriptive for the second transmission channel 520. In case more communication links are established, the control unit 110 may obtain the multicast precoding information by evaluating further beamforming information descriptive for the further transmission channels. The control unit 110 may be implemented in hardware as a control circuit including or consisting of one or more ICs (integrated circuit), FPGAs (field programmable array), GALs (generic-array of logic), ASICs (application specific integrated circuit) and their equivalents. According to another embodiment the control unit 110 may be realized completely in software running, e.g., in a DSP (digital signal processor) or in an embedded system.

A precoder unit 150 uses a multicast precoding matrix obtained from the multicast precoding information to beamform one, two or more signals and outputs at least two precoded signals obtained by precoding the one, two or more signals. The signals are any transmissions sent to the respective transmission channel. The signals may include communication data, system synchronization information or any test signals e.g. used for channel or noise estimation. The precoder unit 150 may be implemented in hardware as a precoder circuit electrically coupled to the control unit 110 and including or consisting of one or more ICs, FPGAs, GALs, ASICs and their equivalents. The control und precoder units 110, 150 may be integrated in the same IC housing or may share the same circuitry. According to another embodiment the precoder unit 150 is realized completely in software running, e.g., in a DSP (digital signal processor) or in an embedded system.

A transmitter circuit 190 receives the precoded signals and multicasts transmission signals through the first and second transmission channels 510, 520, thereby establishing at least two multicast communication links between the transmitting communication device 100 and the receiving communication devices 910, 920 wherein the transmitting communication device 190 sends the same transmission signals to both receiving communication devices 910, 920. Accordingly, both receiving communication devices 910, 920 receive, process and evaluate the same transmission signals. The transmitter circuit 190 may be implemented in hardware including or consisting of one or more ICs, FPGAs, GALs, ASICs and their equivalents. According to another embodiment the transmitter circuit 190 may include software running, e.g., in a DSP or an embedded system. The control unit 110, the precoder unit 150 and the transmitter circuit 190 may share the same computational resources.

The beamforming information evaluated by the control unit 110 relates one or more candidate matrices to one or more channel parameters descriptive for the first and second transmission channels 510, 520.

According to an embodiment the channel parameters describe transmission direction and and transmission distance of the respective transmission channels 510, 520. According to another embodiment, the channel parameters include or consist of a channel quality criterion that describes a transmission characteristic of the first and second transmission channels 510, 520 in case the respective candidate matrix is used for precoding a signal. The candidate matrices may be vectors or combinations of beamforming parameters like beamforming angles.

The control unit 110 may in one embodiment provide the multicast precoding matrix by using an^ algorithm considering whether or not one of the transmission channels 510, 520 exhibits a better transmission quality for all candidate matrices than the others.

When for at least a first one of the candidate matrices the channel quality criterion indicates in some respect a better transmission quality through the first transmission channel 510 and for at least a second one of the candidate matrices the channel quality criterion indicates in the same respect a better transmission quality through the second transmission channel 520, determining the multicast precoding matrix includes in one embodiment identifying those candidate matrices that provide approximately equal channel quality criteria for at least the first and second transmission channels 510, 520. According to an embodiment, determining the multicast precoding matrix may include selecting from the candidate matrices providing approximately equal channel quality criteria that candidate matrix providing the best channel quality.

The channel quality criterion may be the SNR, a number indicating a range in which the SNR falls, the maximum data throughput rate, a BER (bit error rate) or a number indicating a range of the BER. With the channel quality criterion being the SNR, two candidate matrices are assumed to provide equal channel criteria when the SNRs deviate from each other by not more than a preset value, for example 3 dB. According to an embodiment the preset value may be 0.5 dB. In case the channel quality criterion is an index identifying a preset range of the SNR, two candidate matrices are assumed to provide equal channel criteria when they have the same range index. Equivalent considerations apply to BER and data throughput rate.

As a result, in cases when for at least a first one of the candidate matrices the channel quality criterion indicates a better transmission quality through the first transmission channel 510 and for at least a second one of the candidate matrices the channel quality criterion indicates a better transmission quality through the second transmission channel 520, in other words for more or less balanced transmission channels, the transmitting communication device 100 uses a precoding matrix that ensures that in case of multicast transmission all transmission channels 510, 520 exhibit the best common SNR. The receiving communication devices 910, 920 receive the multicast transmission signal at the same quality level without wasting channel resources. Equalized SNR by beamforming results in that all communication links have identical SNR margins and therefore identical QoS (quality of service) conditions. The embodiments allow multicast transmission to benefit from beamforming. If the communication system 500 uses QAM (quadrature amplitude modulation), identical constellations may be used in the multicast transmission for corresponding carriers.

Usually, in a communication system some of the communication links have better SNR allowing high constellations and other communication links have a low SNR allowing only low constellations. If the SNRs in the concerned communication links differ from each other, the transmitting communication device 100 has to adjust the constellations in a way that the communication link exhibiting the lowest SNR is supported. Therefore system resources are wasted since the other links do not exploit the better transmission quality of their transmission channels. In case two or more transmission channels 510, 520 have approximately equal SNRs the availability of each transmission channel 510, 520 can be exploited to a higher degree at least in cases with more or less balanced communication links.

Otherwise, for strongly unbalanced systems with one of the transmission channels 510, 520 inferior to the others for all candidate matrices, the candidate matrix with the best channel quality criterion for the most inferior transmission channel may be selected as the multicast precoding matrix.

Each of the receiving communication devices 910, 920 includes a receiver circuit 890 for receiving at least one multicast transmission signals and a decoder unit 850 that applies a decoding matrix adapted to the multicast precoding matrix and the concerned transmission channel. The decoding matrices for decoding the multicast transmission signals in the first and second receiving communication devices 910, 920 may be equal or may differ from each other. For providing the adapted decoding matrices, the transmitting communication device 100 may transmit information descriptive for the precoding matrix to the concerned receiving communication devices 910, 920. According to another embodiment, the transmitting communication device 100 may apply beamforming on one or more types of non-payload data, for example burst preambles, frame control signals, and delimiters. The concerned receiving communication devices 910, 920 may perform an additional channel estimation phase for estimating the new equivalent channel, wherein the new equivalent channel takes account of both the multicast beamforming and the actual transmission channel.

According to another embodiment the decoder unit 850 decodes the at least two transmission signals to obtain at least one decoded signal and the communication device 100 is configured to transmit expanded beamforming information, for example in response to a test signal received through the receiver circuit 810.

Figure 1B:
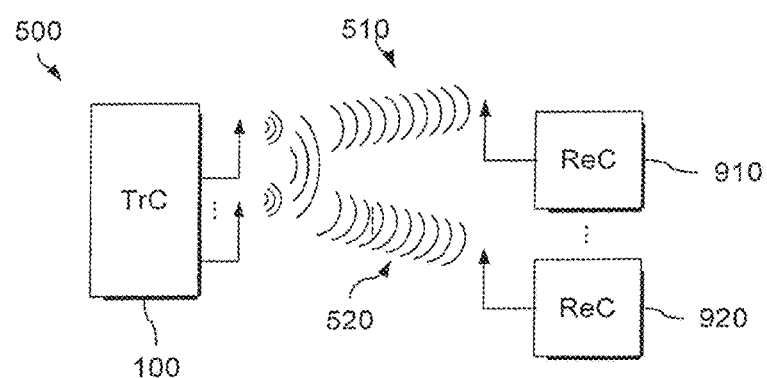
FIG. 1B is a schematic block diagram of a communication system according to an embodiment referring to wireless transmission.

FIG. 1B shows the communication system 500 of FIG. 1A for wireless applications. The communication system 500 may be an ad-hoc network, for example a WLAN (wireless local area network) or a wireless network of sensor and actuator devices. The communication links between the first communication device 100 and the second communication devices 910, 920 may be bidirectional.

Figure 1C:
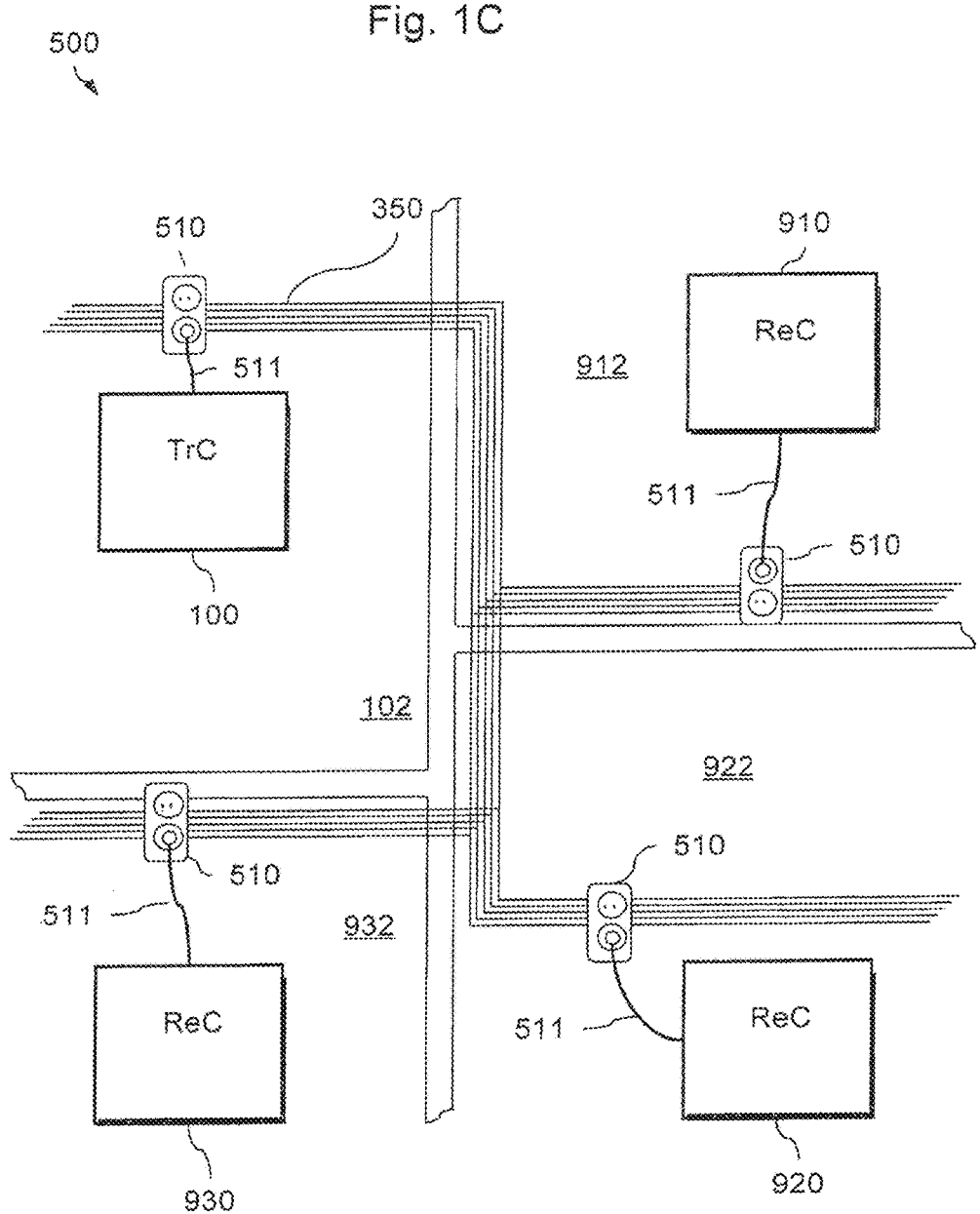
FIG. 1C is a schematic block diagram of a PLC (power line communication) system in accordance with a further embodiment.

FIG. 1C refers to an embodiment of the communication system 500 of FIG. 1A with the transmission channels 510, 520 embodied by in-house electric power wiring 350 including three or more electrical conductors used for transmission of AC (alternating current) electric power and installed as permanent wiring within buildings or buried in the ground. For example, the communication system 500 may include a transmitting communication device 100 that may be integrated in or electrically coupled with, for example, a home server containing and administering video, audio or data content in a first room 102. In a second room 912, a first receiving communication device 910 may be integrated in or electrically coupled to a router connected to the Internet. In a third room 922 a second receiving communication device 920 may be integrated in or electrically coupled to a home computer and in a fourth room 932 a third receiving communication device 930 may be integrated in or electrically coupled to a television apparatus.

Line cords 511 plugged into power outlets 510 connect the communication devices 100, 910, 920, 930 with the in-house electric power wiring 350. Via the communication devices 100, 920, 930 the home server in the first room 102 may multicast a video stream to the home computer in the third room 922 and the television apparatus in the fourth room 932, wherein the multicast signal may include two or more contemporaneously transmitted transmission signals. The television apparatus and the home computer may receive, evaluate and process the transmission signal in the same way.

For example, the transmitting communication device 100 may supply two differential transmission signals using the life or phase wire (L, P), the neutral wire (N), and protective earth (PE) wherein the differential transmission signals are modulated on a carrier superposing the AC frequency of the mains voltage. The receiving communication devices 910, 920, 930 may receive two or three differential receive signals between life wire and neutral wire, between neutral wire and protective earth, and between life wire and protective earth. According to other embodiments, the second communication devices 910, 920, 930 may receive one or two differential receive signals together with a common mode signal resulting from a leakage current from the wiring as a further receive signal.

Figure 1D:
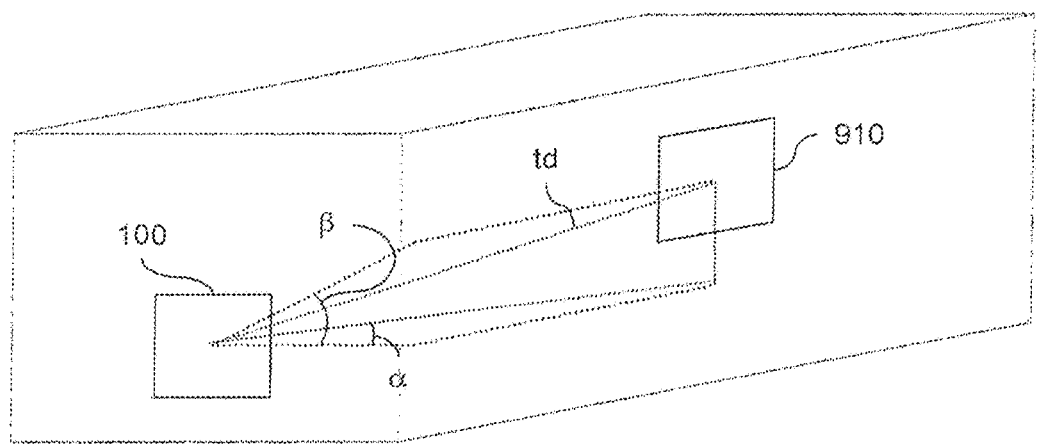
FIG. 1D is a schematic diagram for illustrating channel parameters of a wireless communication system according to an embodiment.

FIG. 1D illustrates channel parameters for a wireless communication system using beamforming. A transmission channel between the transmitting communication device 100 and a receiving communication device 910 may be described by the transmission angles α, β an the transmission distance td, by way of example.

Figure 2A:
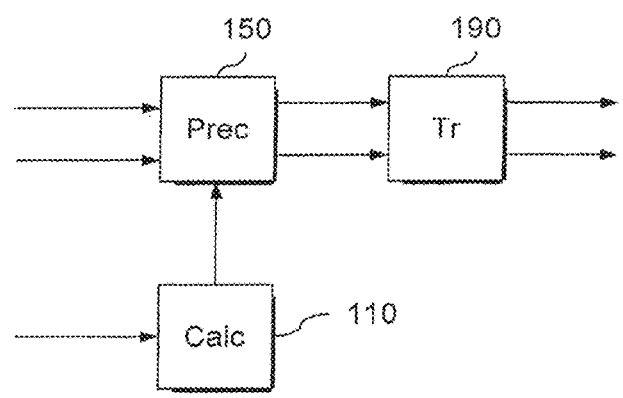
FIG. 2A is a schematic block diagram of a communication device in accordance with an embodiment providing multicasting of a Eigenbeamformed signal.

FIG. 2A refers to an embodiment providing Eigenbeamforming of two signals, wherein each signal may be assigned to another content. The precoder unit 150 eigenbeamforms the signals using a multicast precoding matrix. The precoder unit 150 outputs two or more precoded signals, wherein at least one of the precoded signals is a multicast signal. The transmitter circuit 190 receives the precoded signals and transmits transmission signals obtained from the precoded signals. The control unit 110 obtains multicast precoding information descriptive for a multicast precoding matrix from first and second beamforming information descriptive for the first and second transmission channels through which the multicast transmission signals are transmitted.

In case of Eigenbeamforming, the precoder matrix is a unitary matrix V. In case of two transmit ports and two signals, the unitary matrix V is a complex 2×2 matrix whose entries can be derived from two beamforming angles θ and ψ as given by equation (1):

$$\underline{V} = [\underline{v}_1 \; \underline{v}_2] = \begin{bmatrix} v_{11} & v_{12} \\ v_{21} & v_{22} \end{bmatrix} = \begin{bmatrix} \cos\psi & \sin\psi \\ -e^{j\theta}\sin\psi & e^{j\theta}\cos\psi \end{bmatrix} \quad (1)$$

All possible precoding matrices including the candidate matrices can be represented by combinations of the beamforming angles θ, ψ within the ranges $0 \leq \psi \leq \pi/2$ and $-\pi \leq \theta \leq \pi$.

In each receiving communication device 910, 920 a decoder unit decodes the receive signals using a decoding matrix. Provided that a MIMO equalizer in the receiving communication devices is based on ZF (zero-forcing) detection, the detection matrix W is given by the pseudo inverse matrix $H^P$ of the channel matrix H and the hermitian transpose $V^H$ of the precoding matrix V as given by equation (2).

$$W = V^H H^P = V^H (H^H H)^{-1} H^H \quad (2)$$

The SNR of the decoded receive signals is given by equations (3a) and (3b):

$$SNR_1 = \rho \frac{1}{\|w_1\|^2} \quad (3a)$$

$$SNR_2 = \rho \frac{1}{\|w_2\|^2} \quad (3b)$$

In equations (3a), (3b) ρ gives a ratio of transmit power to noise power and the terms $\|w_i\|$ give the norm of the i-th row of the decoding matrix W. From this follows that the SNR depends on the beamforming angles θ and ψ and the channel matrix H. The relationship between combinations of the beamforming angles θ and ψ and the SNR can be represented by beam maps. A complete beam map of a transmission channel assigns, to each combination or pairs of beamforming angles θ and ψ, the corresponding SNR.

According to an embodiment, only the dominant precoded signal providing the highest SNR is used for multicast transmission and the second and further precoded signals are neglected in the process of determining the multicast precoding matrix. The second and further precoded signals may also be neglected for transmission. According to other embodiments, the second precoded signal may be used for transmitting a further signal, which may be a unicast signal.

Figure 2B:
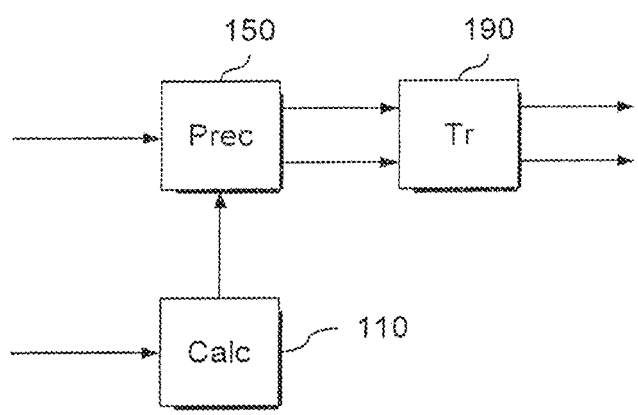
FIG. 2B is a schematic block diagram of a communication device in accordance with an embodiment providing multicasting of spot beamformed signals.

FIG. 2B refers to an embodiment of the communication device 100 providing spot beamforming. The precoder unit 150 beamforms one single signal to at least two beamformed signals. The transmitter circuit 190 receives the at least two precoded signals and multicasts a corresponding number of transmission signals derived from the precoded signals. In the case of a precoder unit 150 providing two spot beamformed signals, the precoding matrix V as given in equation (4) is represented by a beamforming vector corresponding to the first column vector of the matrix V of equation (1):

$$\underline{V} = \underline{v}_1 = \begin{bmatrix} v_{11} \\ v_{21} \end{bmatrix} = \begin{bmatrix} \cos\psi \\ -e^{j\theta}\sin\psi \end{bmatrix} \quad (4)$$

Here and in the following the description refers to two transmission signals derived from two precoded data signals for illustrative purposes. Other embodiments may provide three or more precoded data signals and a corresponding number of transmission signals.

The following Figures refer to embodiments providing expanded beamforming information to the control units 110 of the preceding Figures, wherein expanded beamforming information contains more information about a relationship between the beamforming angles θ, ψ and a channel quality criterion than a minimum beamforming information. The minimum beamforming information describes not more than a specific precoding matrix and one or more channel parameters linked to the use of the specific precoding matrix. According to an embodiment the channel parameter may be a channel quality criterion, e.g. the highest SNR possible by beamforming, and the specific precoding matrix is that one required at the transmitter side for providing the channel quality criterion, e.g. that one required for achieving the highest SNR possible by beamforming. For example, the specific precoding matrix may be obtained by singular value decomposition using channel impulse response estimates. Other embodiments may rely on BER or data throughput as the channel quality criterion or may link a specific precoding matrix with suppressing noise or reducing EMI at certain locations. The following embodiments refer to the SNR as an example for the channel quality criterion.

Figure 3A:
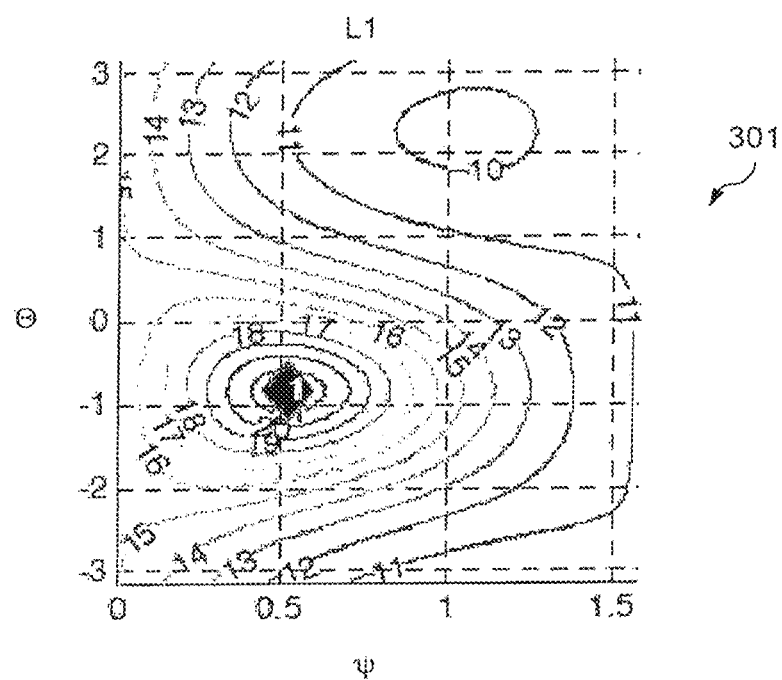
FIG. 3A is a schematic diagram showing a beam map of a first communication link of a communication system for illustrating effects of the embodiment.
Figure 3B:
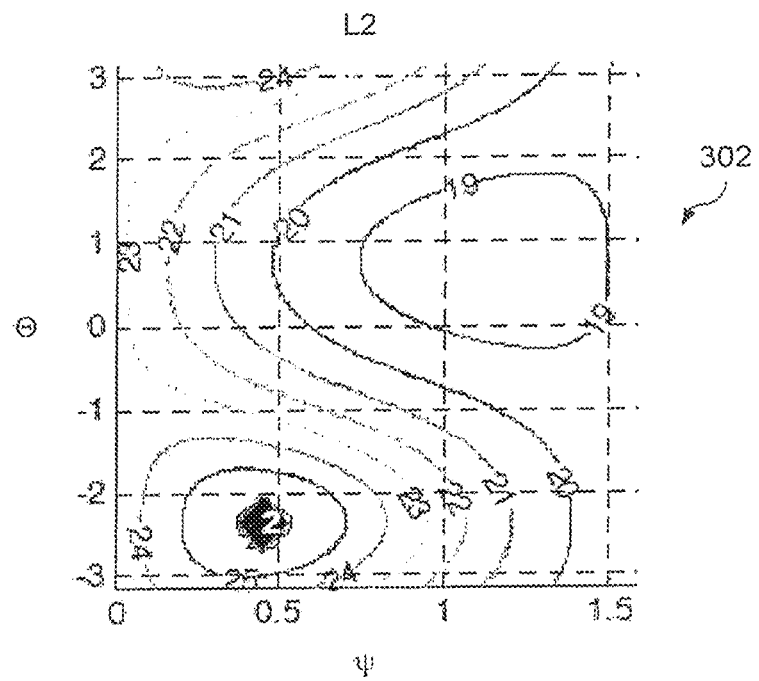
FIG. 3B is a schematic diagram showing a beam map of a second communication link of a communication system for illustrating effects of the embodiment.
Figure 3C:
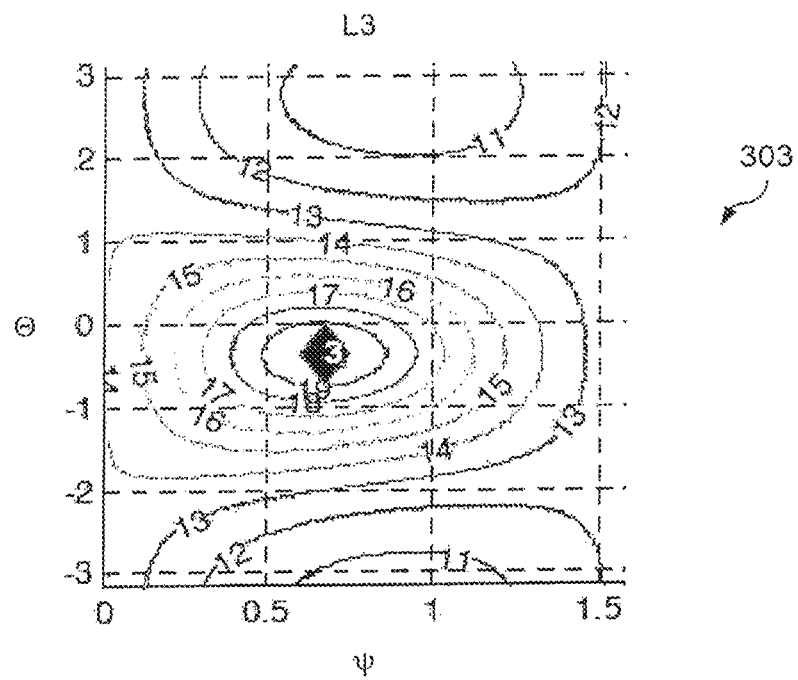
FIG. 3C is a schematic diagram showing a beam map of a third communication link of a communication system for illustrating effects of the embodiment.

FIGS. 3A to 3C show three beam maps 301, 302, 303 for three communication links L1, L2, L3 between a transmitting communication device 100 and three receiving communication devices 910, 920, 930 as illustrated in FIG. 1A. Each beam map shows the SNRs for every combination of the beamforming angles θ, ψ in one of the communication links L1, L2, L3 for an arbitrary selected frequency carrier. In each beam map the horizontal and vertical axes represent the beamforming angles θ, ψ. The contour lines connect combinations of the beamforming angles θ, ψ having the same SNR and are labeled with the pertinent SNR value in dB. Each beam map spans a 3D surface in the space defined by the three axes defined by the first beamforming angle θ, the second beamforming angle ψ and the SNR.

The beamforming angles θ, ψ may be used as the entries of candidate matrices. Summarized, the complete beam maps 301, 302, 303 give the SNR for any combination of the beamforming angles θ, ψ for all communication links L1, L2, L3 in case of a unicast transmission. The combination of beamforming angles θ, ψ providing the highest SNR possible for the respective transmission channel by beamforming is marked with the diamond symbol. The diamond symbol indicates the combination of beamforming angles θ, ψ selected for beamforming with the best SNR or at maximum data throughput rate for unicast transmission.

The beam maps are derived for each communication link L1, L2, L3 or transmission channel and each frequency carrier separately, and the beam maps of different communication links or other frequency carriers typically differ from each other. The beam maps for each communication link may be calculated using the beamformed signal optimized for any of the other communication links.

The beam maps change when the properties of the transmission channel change, for example if in a mains grid a switch for an electric load is toggled. Accordingly a communication device may monitor the transmission channel to update the beam maps when required. Alternatively or in addition the communication devices may update their beam maps periodically at predetermined intervals.

In case of an OFDM system using a plurality of spaced subcarriers, a beam map may be determined for each subcarrier frequency individually. Alternatively, the same beam map may be assigned to a group of neighboring subcarriers. In addition or alternatively beam maps of some subcarriers may be interpolated from the beam maps of adjacent subcarriers.

Minimum beamforming information identifies not more than one point of the 3D surface of the beam map, e.g. the beamforming angles θ, ψ assigned to the maximum SNR and the maximum SNR value. Expanded beamforming information identifies at least two points of the 3D surface. According to an embodiment, the expanded beamforming information identifies at least location and value of the maximum SNR and location and SNR value of one or more further points of the 3D surface. The further points may be further local maxima and minima SNRs. According to other embodiments, the expanded beamforming information may contain the SNRs for a predefined number of predefined pairs of beamforming angles θ, ψ, for example the SNRs assigned to intersection points of an orthogonal grid, which may have equally spaced meshes. The expanded beamforming may include location and SNRs values for 2 to 256 points on the 3D surface of the beam map, by way of example, wherein the size of the feedback information per combination of the beamforming angles θ and ψ may be between 1 and 8 bits.

According to an embodiment the transmitting communication device 100 may obtain the expanded beamforming information by transmitting signals trying various combinations of the beamforming angles θ, ψ to each of the receiving communication devices 910, 920, 930 selected for participating in the multicast transmission. The receiving communication devices 910, 920, 930 may analyze a specific portion of signals that contain payload data, for example a preamble portion containing training symbols, or pilot portions interspersed in the signal on specific frequency carriers, Other embodiments may provide specific test signals to this purpose. In response to the signals, each of the concerned receiving communication devices 910, 920, 930 feedbacks information descriptive for the optimum combination of beamforming angles θ, ψ and an updated tone map including information descriptive for the SNR achieved with the optimum combination of beamforming angles θ, ψ. The transmitting communication device 100 may use the received information for gathering the expanded beamforming information or for looking for better choices for the combination of beamforming angles θ, ψ in a systematic manner. Since the approach gets by with feedback information defined in existing standards, the approach can be implemented on top of any standard that already supports beamforming like Homeplug AV2 or G.hn 9963.

Other embodiments may provide, as the expanded beamforming information, an index descriptive for one of several predefined candidate functions and coefficients for locally modifying the indicated candidate function. The candidate functions may differ as regards topological characteristics of the 3D surface, e.g. number and relative orientation of local SNR maxima and SNR minima. By applying the coefficients, which may include local compression/stretching factors along the axes, to the candidate function the resulting approximation function may approximate the actual beam map.

FIGS. 4A to 4D refer to an embodiment based on receiving expanded beamforming information. Expanded beamforming information contains more information of the beam map of a communication link than minimum information, e.g. about the maximum SNR and the beamforming angles θ, ψ assigned to the maximum SNR. For example, the expanded beamforming information contains in addition to the minimum information further information about position and value of selected points in the 3D surface of the beam map, for example information about location and values of local SNR minima and SNR maxima, the SNRs of regularly spaced points, or of points selected according to their information content. The expanded beamforming information may describe at least 8 points (3-bit feedback information size) of the 3D surface of the beam map, for example up to 1024 points, wherein a size of feedback information for the angles θ and ψ may be 10 bit. According to another embodiment the expanded beamforming information may contain information descriptive for a mathematical expression approximating the actual beam map.

Figure 4A:
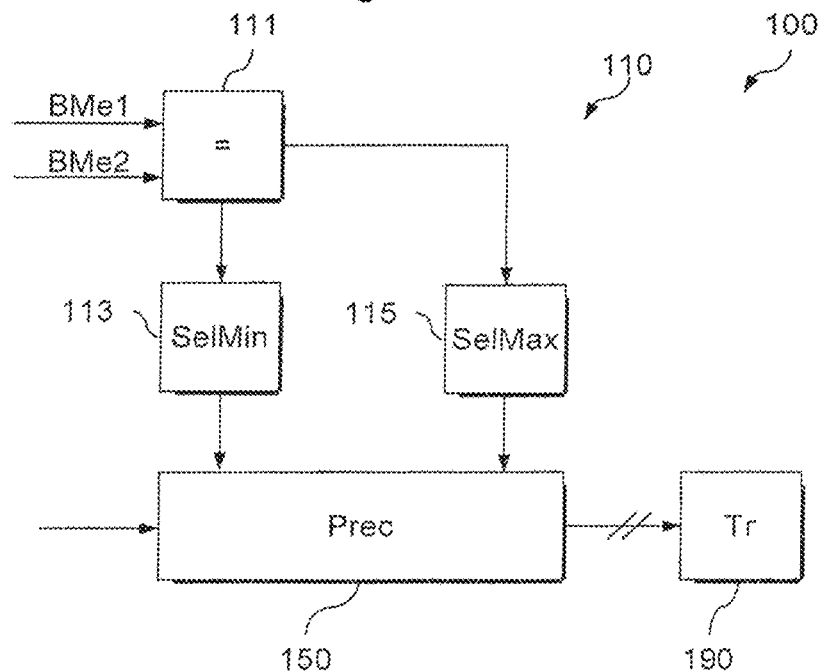
FIG. 4A is a schematic block diagram of a communication device in accordance with an embodiment relying on expanded beamforming information.

The control unit 110 of FIG. 4A receives first expanded beamforming information BMe1 related to a first communication link L1 and second expanded beamforming information BMe2 related to a second communication link L2. A comparator unit 111 may compare the SNRs of corresponding combinations of the beamforming angles θ, ψ contained in or derived by way of interpolation or extrapolation from in the expanded beamforming information BMe1, BMe2. For example, the comparator unit 111 may subtract the SNRs of the second expanded beamforming information BMe2 from the corresponding SNRs of the first expanded beamforming information BMe1 and may check, for each available combination of beamforming angles θ, ψ, whether the resulting difference is below a predetermined threshold or, otherwise, the sign of the difference.

If for all combinations of the beamforming angles θ, ψ, for which the expanded beamforming information contains information about the SNR, the SNRs of the first expanded beamforming information BMe1 exceed the SNRs of the second expanded beamforming information BMe2, then the second communication link is always inferior to the first communication link. In this case a first selector unit 113 selects a combination of beamforming angles θ, ψ that is assigned to the highest SNR in the second expanded beamforming information BMe2 as the multicast precoding matrix for multicast transmission on both communication links. If all SNRs of the second expanded beamforming information BMe2 exceed the corresponding SNRs in the first expanded beamforming information BMe1, then for each combination of beamforming angles θ, ψ the first communication link is inferior to the second communication link and the first selector unit 113 selects that combination of beamforming angles θ, ψ which is assigned to the highest SNR in the first expanded beamforming information BMe1 as the multicast precoding matrix.

If for at least one combination of beamforming angles θ, ψ the difference of the corresponding SNRs is less than a predetermined threshold, for example less than 3 dB or less than 0.5 dB, then a second selector unit 115 selects from all combinations of beamforming angles θ, ψ for which the SNRs of the two communication links deviate from each other by not more than the predetermined threshold one with the highest SNR.

Each of the comparator unit 111, the first selector unit 113 and the second selector unit 115 may be implemented in hardware as comparator circuit, first selector circuit and second selector circuit, each of them including or consisting of one or more ICs, FPGAs, GALs, ASICs and their equivalents. According to another embodiment one, two or all of the comparator unit 111, the first selector unit 113 and the second selector unit 115 may include software running, e.g., in a DSP or an embedded system.

Figure 4B:
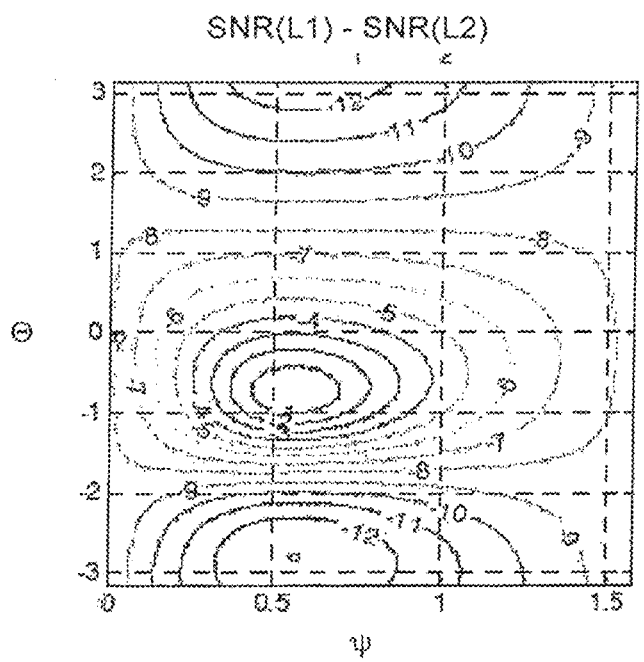
FIG. 4B shows a schematic diagram illustrating an SNR difference between the first and the second communication links of FIGS. 3A and 3B for illustrating a method of obtaining multicast precoding matrices using the communication device of FIG. 4A.
Figure 4C:
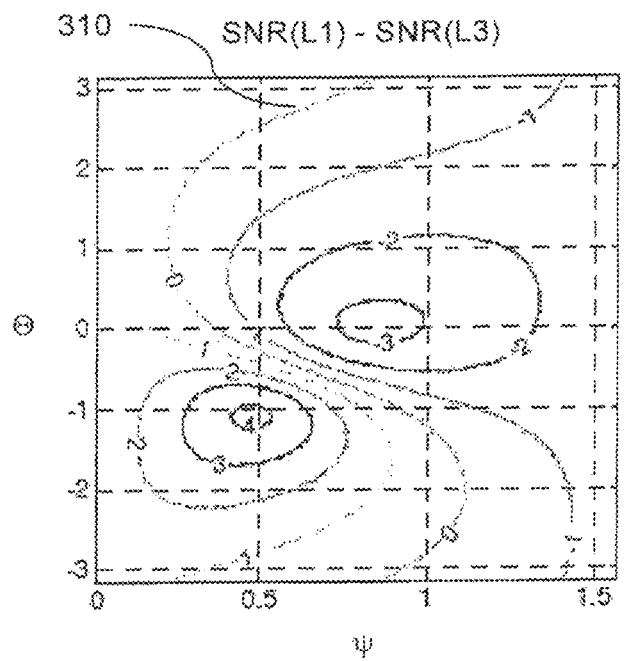
FIG. 4C shows a schematic diagram illustrating an SNR difference between the first and the third communication links of FIGS. 3A and 3C for illustrating a method of obtaining multicast precoding matrices using the communication device of FIG. 4A.
Figure 4D:
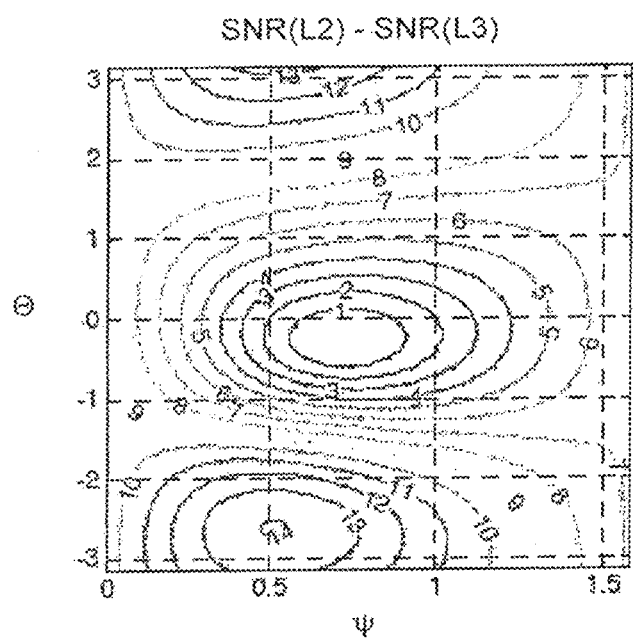
FIG. 4D shows a schematic diagram illustrating an SNR difference between the second and the third communication links of FIGS. 3B and 3C for illustrating a method of obtaining multicast precoding matrices using the communication device of FIG. 4A.

FIGS. 4B to 4D refer to the communication links L1, L2, L3 shown in FIGS. 3A to 3C. The contour lines indicate combinations of beamforming angles θ, ψ for which the SNRs of the concerned communication links have the same distance to each other. The numbers attached to the contour lines give the SNR difference in dB.

The diagram in FIG. 4B shows the result of subtracting the beam map of the second communication link L2 from the beam map of the first communication link L1. The resulting SNRs are all negative indicating that the first communication link L1 is the inferior of both. The beamforming angles θ=−0.9 and ψ=0.55 indicating in FIG. 3A the maximum SNR in the first communication link L1 are selected for a multicast transmission through the first and second communication links L1, L2.

The diagram of FIG. 4C shows the result of subtracting the complete beam map of the third communication link L3 of FIG. 3C from the complete beam map of the first communication link L1 of FIG. 3A. FIG. 4C reveals that for first combinations of beamforming angles θ, ψ the SNR differences are negative indicating that the first communication link L1 is inferior to the third communication link L3 and that for second combinations of beamforming angles θ, ψ the SNR differences are positive indicating that the third communication link L3 is inferior to the first communication link L1. Along a line 310 the SNR differences are equal zero. One of the combinations of beamforming angles θ, ψ along line 310 may be selected as the multicast precoding matrix to ensure equal QoS for a multicast transmission through the first and third communication links L1, L3.

The diagram of FIG. 4D shows the result of subtracting the complete beam map of the third communication link L3 of FIG. 3C from the complete beam map of the second communication link L2 of FIG. 3B. All SNR values are positive indicating that the third communication link L3 is inferior to the second communication link L2. The beamforming angles θ=−0.35 and ψ=0.65 indicating in FIG. 3C the maximum SNR in the third communication link L3 are selected for a multicast transmission through the second and third communication links L2, L3.

Figure 4E:
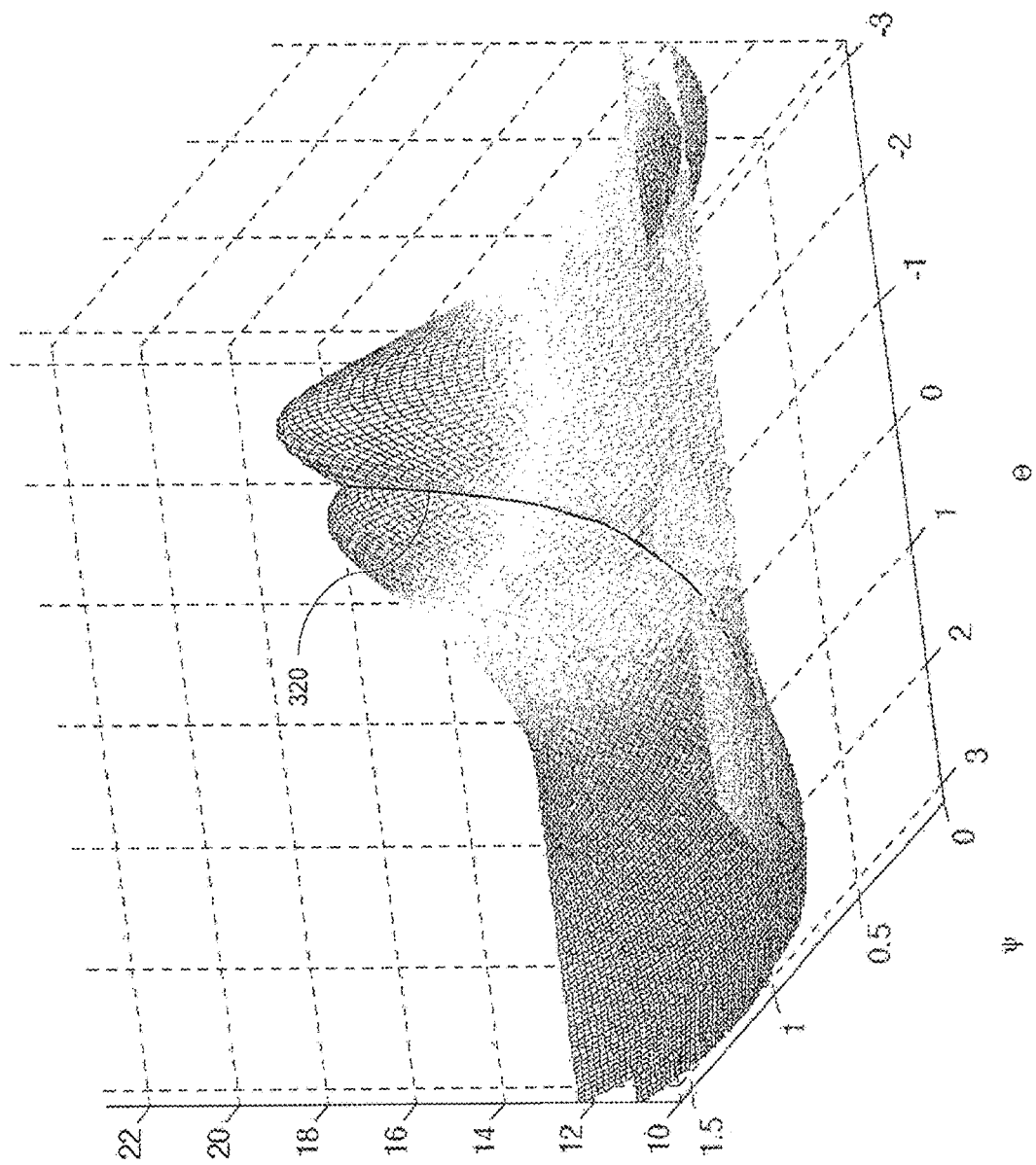
FIG. 4E is a schematic 3D plot of the beam maps of the first and third communication links of FIGS. 3A and 3C.

FIG. 4E is a 3D diagram showing the beam maps for the first and third communication links L1, L3. Line 320 is the intersection line between the two 3D surfaces and corresponds to line 310 in FIG. 4D indicating all combinations of beamforming angles θ, ψ providing equal SNRs to both the first and the third communication links L1, L3. From these combinations, that one providing the highest SNR, which is defined by the saddle or anticline between the two peaks of the two 3D surfaces, is selected as the multicast precoding matrix to maximize the SNR at equal QoS for both communication links. In other words, in case of two or more communication links L1, L2, L3 a beamforming setting is selected where the SNR of the at least two most inferior communication links are equal and maximal.

Instead of the lines 310, 320 indicating equal SNRs in FIGS. 4C and 4D, twisted ribbons including and extending along the lines 310, 320 may indicate combinations of the beamforming angles θ, ψ with the SNRs of the concerned communication links deviating from each other by at most a predefined threshold. Accordingly, from these combinations that one providing the highest SNR is selected as the multicast precoding matrix to maximize the SNR at approximately equal QoS for both communication links.

The embodiments described above refer to multicast transmission on two communication links. In the case of multicasting on three, the control unit 110 of FIG. 4A may in one embodiment check, for each beam map, whether the peak indicating the maximum SNR is the highest SNR among all beam maps at the same combination of beamforming angles θ, ψ. In this case typically at least one intersection point exists between all three beam maps and the control unit 110 selects the beamforming angles θ, ψ assigned to the intersection point or, in the case of more than one intersection points, that one of the intersection points providing the highest SNR.

In case of providing multicast transmission through more than three communication links the control unit 110 may identify at least two or all intersection points between the beam maps of three of the communication links. For each combination of beamforming angles θ, ψ identifying an intersection point, the control unit 110 identifies the lowest SNR of all beam maps. Among all identified lowest SNRs assigned to any of the intersection points, the control unit 110 identifies the highest one and selects the corresponding combination of beamforming angles θ, ψ as entries of the multicast precoding matrix. In case of multiple beam maps where the highest SNR of the most inferior communication link is not the highest SNR of all beam maps for the respective combination of beamforming angles θ, ψ, a combination of the rules above may be applied.

According to another embodiment the control unit 110 applies an iterative approach for determining points in the beam maps for each communication link selected for multicast transmission. For each beam map the algorithm may identify the combination of beamforming angles θ, ψ assigned to the maximum SNR of the respective beam map, i.e. the peaks. Among the identified peaks the algorithm may identify that one with the lowest SNR, i.e. the lowest peak. If all other beam maps provide a higher SNR for all combinations of beamforming angles, then the combination of beamforming angles θ, ψ assigned to the lowest peak are selected for providing the precoding matrix for multicast transmission. Otherwise the combination of beamforming angles θ, ψ of the lowest peak provides start values of an iterative process.

From the other identified peaks the algorithm may identify that one with the $2^{nd}$ lowest SNR, i.e. the $2^{nd}$ lowest peak. The combination of beamforming angles θ, ψ of the $2^{nd}$ lowest peak provides target values for beamforming angles θ, ψ checked in course of the iterative process.

The iterative process checks the SNRs of beamforming angles θ, ψ between the lowest peak and the $2^{nd}$ lowest peak. Starting from the start values identifying the lowest peak the iterative process modifies the beamforming angles θ, ψ in the direction of the target values identifying the $2^{nd}$ lowest peak by applying a preset step size and checks for each modified combination of beamforming angles θ, ψ the corresponding SNRs of the beam maps with the lowest peak and the $2^{nd}$ lowest peak. If the SNRs deviate from each other by not more than a predetermined threshold, the current beamforming angles may be selected for determining the multicast precoding matrix. If the SNRs deviate from each other by more than a predetermined threshold, the modification is repeated. If the difference between the SNRs has increased between two iteration steps, the modification may be cancelled and the algorithm may be repeated at a lower step size. According to another embodiment, the ratio of the modification of both beamforming angles may be modified to check whether the assumed saddle between the lowest and the $2^{nd}$ lowest peak is offset to the direct connection line between the two peaks. Otherwise the modification may be repeated until the SNRs of both beam maps are identical or differ from each other by not more than a preset value. The final value of the modification is selected for determining the entries of the precoding matrix.

Another embodiment of the communication device 100 gets by with minimum beamforming information including not more than the beamforming angles for the optimum unicast communication link, which may be quantized, and at least coarse information about the SNR of the communication link at the optimum beamforming angles. Typically this information is available in standardized systems providing beamforming, for example Eigenbeamforming or spot beamforming for unicast transmission. In such systems the receiving communication devices may feed back a tone map and optimum beamforming angles or pointers into a LUT (look-up table) identifying the optimum beamforming angles, wherein different optimum beamforming angles may be determined for different subcarrier frequencies. The tone map may include, for at least two different frequency bands, an index identifying a preset range within which the SNR of the concerned communication link is when the optimum beamforming angles are applied for the respective frequency band.

Using the beamforming angles identifying the position of the peaks of the communication links selected for multicast transmission as start values, the control unit 110 may select a combination of beamforming angles θ, ψ between the peaks. By trial and error, the optimum combination of the beamforming angles θ, ψ might be found by comparing the constellation of the tone maps of the concerned communication links. The control unit 110 may select a combination of beamforming angles θ, ψ showing identical and maximal constellation or identical constellation and SNRs. Since the approach exploits not more than feedback information defined in existing standards, the approach can be implemented on top of any standard, which already supports beamforming.

According to a further embodiment, the transmitting communication device 100 tries various combinations of the beamforming angles θ, ψ and the receiver may feedback information about the optimum beamforming angles θ, ψ on the basis of the tried beamforming angles θ, ψ and the tone map. Using this information, the transmitting communication device 100 derives another point of the beam map for a further trial. For example, the control unit 110 applies an iterative trial-and-error algorithm and transmits test signals through the at least first and second channels using different precoding matrices. In response to the test signals each of the concerned receiving communication devices sends updated beamforming information, e.g. the beamforming angles for a precoding matrix optimized for the new equivalent channel and the SNR for the updated beamforming angles. The control unit 110 evaluates the updated beamforming information. The control unit 110 tries new precoding matrixes until the updated SNRs deviate from each other by less than a preset value.

A further embodiment refers to a preset LUT linking the best combination of the beamforming angles θ, ψ for multicast transmission with actual beamforming angles θ, ψ and SNR information or tone maps of each communication link. For each total number of multicast communication links another LUT might be provided. For example another LUT may be used for a multicast communication with two receiving communication devices than for a multicast communication with three receiving communication devices. The pointers accessing the concerned LUT may be information from the tone maps and the optimum beamforming angles of the concerned communication links. The entries and the output of the LUTs give the multicast beamforming angles θ, ψ. According to an embodiment, the LUTs might be designed offline, wherein the LUTs might be based on a set of measured exemplary transmission channels. According to another embodiment, the LUTs are gathered in a training mode of the transmitting communication device 100 in the operational environment. As this approach does not require any additional feedback from the receivers, the approach can be implemented without changing existing standards supporting beamforming.

Figure 5:
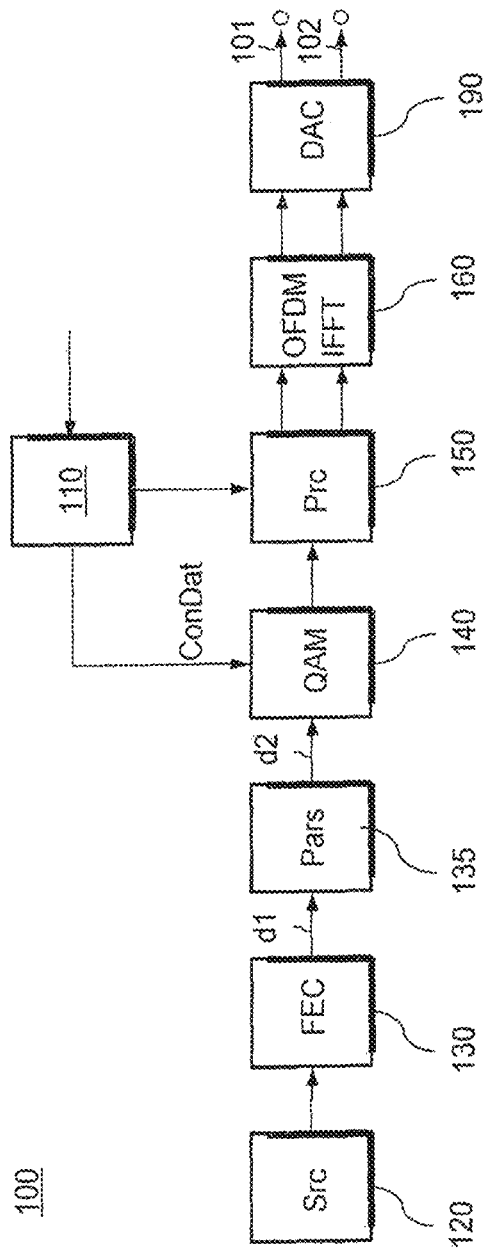
FIG. 5 is a schematic block diagram of a communication device in accordance with an embodiment providing multicast transmission and beamforming for PLC.

FIG. 5 refers to an embodiment with the transmitting communication device 100 providing beamforming for several frequency carriers. A data source, for example a processor unit 120, outputs a primary data stream that contains payload data. An FEC (forward error correction) unit 130 may insert code redundancy according to an error detection scheme for facilitating error correction at the receiver side and outputs a first data stream d1. In case the transmitting communication device 100 provides Eigenbeamforming, a stream parser unit 135 may split up the first data stream d1 into at least two complementary data streams d2 or may multiply, at least double, the first data stream d1 into two or more identical data streams d2 and provides the second data streams d2 to a modulator unit 140. In case of spot beamforming or in a SISO (single-input-single-output) mode the parser unit 135 may directly forward the first data stream d1 as the second data stream d2 to the modulator unit 140.

A modulator unit 140 modulates the data stream d2, for example, by using a plurality of subcarriers and QAMs (quadrature amplitude modulation), respectively. The modulator unit 140 may use constellation data ConDAT resulting from frequency dependent channel characteristics and adapting the QAM scheme to the respective transmission channel. A control unit 110 may derive the constellation data ConDAT from feedback information which may be received, for example, through a receiver unit receiving signals via the same transmission channel through which the transmitting communication device 100 transmits signals.

A precoder unit 150 receives signals corresponding to the one or more modulated data streams and precodes the signals using a precoding matrix V provided by the control unit 110. In the case of multicast transmission the control unit 110 obtains multicast precoding information descriptive for a multicast precoding matrix from evaluating beamforming information from all transmission channels for which the multicast transmission is applied, wherein the beamforming information may be at least partly contained in the received tone map information. The control unit 110 may be one as described above and may provide a multicast precoding matrix allowing, for in substance balanced communication links, approximately equal QoS for all communication links selected for multicast transmission.

An OFDM modulator unit 160 may modulate the precoded (beamformed) signals on a frequency carrier using OFDM (orthogonal frequency division modulation) and inverse fast Fourier transformation to combine the orthogonal signals for obtaining digital signals describing the transmission signals in the time domain. A transmitter circuit 190 may comprise a mixer to shift the base-band signal to a useable frequency range and a DAC (digital to analogue converter) to convert the digital signals into analog transmission signals. The transmitter circuit 190 couples each analog transmission signal to a corresponding transmit port 101, 102. The transmit ports 101, 102 may be antennas or wire connection blocks, by way of example.

The flowchart of FIG. 6 illustrates a method of operating a communication device. The method includes providing multicast precoding information from at least first beamforming information descriptive for a first transmission channel and second beamforming information descriptive for a second transmission channel (602). At least one signal is beamformed using a multicast precoding information, wherein at least two precoded signals are obtained (604). Through a transmitter circuit that is electrically coupled to the precoder unit transmission signals derived from the precoded signals are multicast through the at least first and second transmission channels (606).

Obviously, numerous modifications and variations of the present disclosure are possible in light of the above teachings. It is therefore to be understood that within the scope of the appended claims, the invention may be practiced otherwise than as specifically described herein.

The invention claimed is:

1. A communication device comprising:
  circuitry configured to
    obtain multicast precoding information from at least first beamforming information for a first transmission channel and second beamforming information for a second transmission channel, the first beamforming information and the second beamforming information being obtained from a first receiver and a second receiver, respectively, the first transmission channel being between the communication device and the first receiver, and the second transmission channel being between the communication device and the second receiver;
    beamform at least one signal using the multicast precoding information to obtain at least two precoded signals; and
    multicast transmission signals derived from the at least two precoded signals through the at least first and second transmission channels,
  wherein the circuitry is configured to perform spot beamforming on the transmission signals, and
  each of the at least first and second beamforming information contains a minimum information for a specific precoder matrix for a unicast transmission through the respective transmission channel and a corresponding SNR (signal-to-noise ratio) information.

2. The communication device according to claim 1, wherein
  each of the first and second beamforming information relates one or more candidate precoding matrices to a channel quality criterion resulting by applying the respective candidate precoding matrix to the respective transmission channel.

3. The communication device according to claim 2, wherein
  the circuitry is configured to:
    identify candidate matrices providing channel quality criteria that are equal for the at least first and second transmission channels when
      the first transmission channel has a higher value of a criterion of the channel quality criteria than the second transmission channel for at least a first matrix of the candidate matrices, and
      the second transmission channel has a higher value of a criterion of the channel quality criteria than the first transmission channel for at least a second matrix of the candidate matrices, and
    select the candidate matrices as the multicast precoding information, and
  the channel quality criteria for the first and second transmission channels includes at least one of SNR (signal-to-noise ratio), a number indicating a range of the SNR, a maximum data throughput rate, BER (bit error rate) and a number indicating a range of the BER.

4. The communication device according to claim 3, wherein the channel quality criteria of the at least first and second transmission channels are equal when corresponding SNRs (signal-to-noise ratios) for the at least first and second transmission channels deviate from each other by not more than a given threshold.

5. The communication device according to claim 4, wherein the given threshold is 0.5 dB.

6. The communication device according to claim 3, wherein the circuitry is configured to obtain the multicast precoding information by selecting, from the candidate matrices providing equal channel quality criterions, a candidate matrix providing the best channel quality criterion.

7. The communication device according to claim 1, wherein
the circuitry is configured to:
determine whether a result of subtracting values of SNRs (signal-to-noise ratios) for the first transmission channel from values of SNRs for the second transmission channel is positive or negative,
identify a candidate matrix providing equal and maximal SNRs for at least an inferior transmission channel of the at least first and second transmission channels, and
select the candidate matrix as the multicast precoding information, wherein the first transmission channel is inferior when the result is negative and the second transmission channel is inferior when the result is positive.

8. The communication device according to claim 1, wherein the circuitry is configured to perform an iterative algorithm searching between SNR maxima of two communication links for a precoding matrix providing equal SNRs for the two communication links.

9. The communication device according to claim 8, wherein the two communication links are the communication links with the lowest and the second lowest maximum SNR among all communication links selected for multicast transmission.

10. The communication device according to claim 9, wherein each of the at least first and second beamforming information contains information for at least one further precoder matrix and a corresponding SNR (signal-to-noise ratio) resulting from a unicast transmission through the respective transmission channel using the at least one precoder matrix.

11. The communication device according to claim 1, wherein each of the at least first and second beamforming information contains information descriptive for at least all other evaluated unicast precoder matrices and corresponding SNR (signal-to-noise ratio) information.

12. The communication device according to claim 1, wherein
at least one of the at least first and second beamforming information is contained in an OFDM (orthogonal frequency division multiplexing) feedback signal received by the circuitry, and
the OFDM feedback signal contains a tone map that includes an index identifying a preset range of the SNRs for at least two different frequency bands of the at least first and second transmission channels.

13. The communication device according to claim 1, wherein the communication device is a PLC (power line communication) device and the circuitry is configured to multicast the transmission signals through power lines.

14. The communication device according to claim 1, wherein the circuitry is configured to apply an iterative trial-and-error method providing transmitting signals through the at least first and second channels using different precoding matrices and evaluating further the at least first and second beamforming information received in response to the signals.

15. A communication system comprising at least three communication devices, wherein at least one of the at least three communication devices comprises:
a control circuit configured to obtain multicast precoding information from at least first beamforming information for a first transmission channel and second beamforming information for a second transmission channel, the first beamforming information and the second beamforming information being obtained from a first receiver and a second receiver, respectively, the first transmission channel being between the communication device and the first receiver, and the second transmission channel being between the communication device and the second receiver;
a precoder circuit configured to beamform at least one signal using the multicast precoding information to obtain at least two precoded signals; and
a transmitter circuit configured to multicast transmission signals derived from the at least two precoded signals through the at least first and second transmission channels,
wherein the transmitter circuit is electrically coupled to the precoder circuit,
the control circuit is configured to perform spot beamforming on the transmission signals, and
each of the at least first and second beamforming information contains a minimum information for a specific precoder matrix for a unicast transmission through the respective transmission channel and a corresponding SNR (signal-to-noise ratio) information.

16. A method of operating a communication device, the method comprising:
obtaining, by circuitry of the communication device, multicast precoding information from at least first beamforming information for a first transmission channel and second beamforming information for a second transmission channel, the first beamforming information and the second beamforming information being obtained from a first receiver and a second receiver, respectively, the first transmission channel being between the communication device and the first receiver, and the second transmission channel being between the communication device and the second receiver;
beamforming, by the circuitry, at least one signal using the multicast precoding information to obtain at least two precoded signals; and
multicasting, by the circuitry, multicast transmission signals through the at least first and second transmission channels, the multicast transmission signals derived from the at least two precoded data signals,
wherein spot beamforming is performed on the transmission signals, and
each of the at least first and second beamforming information contains a minimum information for a specific precoder matrix for a unicast transmission through the respective transmission channel and a corresponding SNR (signal-to-noise ratio) information.

17. The method according to claim 16, wherein each of the at least first and second beamforming information relates one or more candidate precoding matrices to a channel quality criterion resulting by applying the respective candidate precoding matrix to the respective transmission channel.

18. A communication device comprising:
- a control circuit configured to obtain multicast precoding information from at least first beamforming information for a first transmission channel and second beamforming information for a second transmission channel, the first beamforming information and the second beamforming information being obtained from a first receiver and a second receiver, respectively, the first transmission channel being between the communication device and the first receiver, and the second transmission channel being between the communication device and the second receiver;
- a precoder circuit configured to beamform at least one signal using the multicast precoding information to obtain at least two precoded signals; and
- a transmitter circuit configured to multicast transmission signals derived from the at least two precoded signals through the at least first and second transmission channels,
- wherein the transmitter circuit is electrically coupled to the precoder circuit, and
- wherein the control circuit is configured to perform spot beamforming on the transmission signals, and
- each of the at least first and second beamforming information contains a minimum information for a specific precoder matrix for a unicast transmission through the respective transmission channel and a corresponding SNR (signal-to-noise ratio) information.

* * * * *